US008355720B2

(12) United States Patent
Harris (10) Patent No.: US 8,355,720 B2
(45) Date of Patent: Jan. 15, 2013

(54) APPLICATION AND TRANSPORT ADAPTATION FOR A WIRELESS COMMUNICATION PRIOR TO A RESELECTION

(75) Inventor: John M. Harris, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 608 days.

(21) Appl. No.: 11/432,897

(22) Filed: May 12, 2006

(65) Prior Publication Data

US 2007/0263070 A1 Nov. 15, 2007

(51) Int. Cl.
*H04Q 7/20* (2006.01)

(52) U.S. Cl. ........ 455/436; 455/440; 455/441; 455/439; 455/437; 455/435.2

(58) Field of Classification Search .................. 455/456
See application file for complete search history.

(56) References Cited

U.S. PATENT DOCUMENTS

| 6,907,019 | B2 * | 6/2005 | Kotzin et al. ................. 370/332 |
| 7,024,206 | B2 * | 4/2006 | Hamanaga et al. ........ 455/456.1 |
| 7,733,830 | B2 * | 6/2010 | Curcio et al. ................. 370/333 |
| 2002/0010771 | A1 | 1/2002 | Mandato |
| 2004/0095905 | A1 | 5/2004 | Pecen et al. |
| 2005/0049000 | A1 | 3/2005 | Sheynman et al. |

\* cited by examiner

*Primary Examiner* — Olumide T Ajibade Akonai
*Assistant Examiner* — Randy Peaches (57) ABSTRACT

A system [100] includes a wireless entity [115] to provide wireless data, and a mobile station [105] in communication with the wireless entity [115] to receive the wireless data. The mobile station [105] includes a detection element [230] to detect a time interval between a current time and an occurrence of at least one of a reselection, a service interruption, and a seamless transition. A processing element [225] performs at least one of: (a) a full update of a data frame prior the at least one of the reselection and the service interruption; (b) a synchronization of a mobile station application prior to the at least one of the reselection and the service interruption; and (c) a temporary modification of at least one of a network application and the mobile station application prior to at least one of the reselection and the seamless transition.

25 Claims, 6 Drawing Sheets

| | | | | | | | | | | | | | | |
|---|---|---|---|---|---|---|---|---|---|---|---|---|---|---|
| "DEGRADATION" | 0+0 | 1+0 | 7+0 | 0+0 | 0+1 | 0+2 | 0+3 | 0+4 | 0+5 | 0+6 | 0+7 | 0+8 | 0+9 | 0+10 |
| RISK (% TIME NOT AVAILABLE) | $1*X\%$ | $2*X\%$ | $8*X\%$ | $1*X\%$ | $1*X\%$ | $1*X\%$ | $1*X\%$ | $1*X\%$ | $1*X\%$ | $1*X\%$ | $1*X\%$ | $1*X\%$ | $1*X\%$ | $1*X\%$ |
| AGE | 0 | 0 | 0 | 0 | 1 | 2 | 3 | 4 | 5 | 6 | 7 | 8 | 9 | 10 |
| TYPE OF FRAME | FULL 0 | 1 DELTA 1 | 1 DELTA 7 | FULL 8 | FULL 8 | FULL 8 | FULL 8 | FULL 8 | FULL 8 | FULL 8 | FULL 8 | FULL 8 | FULL 8 | FULL 8 |
| RF LINK | OK | OK | OK | OK | RESELECTION | | | | | | | | | |
| TYPE OF FRAME | FULL 1 | 1 DELTA 1 | 1 DELTA 7 | FULL 8 | 8 DELTA 1 | 8 DELTA 2 | 8 DELTA 3 | 8 DELTA 4 | 8 DELTA 5 | 8 DELTA 6 | 8 DELTA 7 | 8 DELTA 8 | 8 DELTA 9 | 8 DELTA 10 |

FIG. 7 — PRIOR ART — (700)

| TARGET/IMAGE QUALITY | | | | | | | | | | | | | | | |
|---|---|---|---|---|---|---|---|---|---|---|---|---|---|---|---|
| "DEGRADATION" (# DELTAS + AGE) | 0+0 | 1+0 | 7+0 | 8+0 | 8+1 | 8+2 | 8+3 | 8+4 | 8+5 | 8+6 | 8+7 | 8+8 | 8+9 | 8+10 |
| RISK (% TIME NOT AVAILABLE) | $1*X\%$ | $2*X\%$ | $8*X\%$ | $9*X\%$ | $9*X\%$ | $9*X\%$ | $9*X\%$ | $9*X\%$ | $9*X\%$ | $9*X\%$ | $9*X\%$ | $9*X\%$ | $9*X\%$ | $9*X\%$ |
| AGE | 0 | 0 | 0 | 0 | 1 | 2 | 3 | 4 | 5 | 6 | 7 | 8 | 9 | 10 |
| TYPE OF FRAME DISPLAYED AT TARGET | FULL 1 | 1 DELTA 1 | 1 DELTA 7 | 1 DELTA 8 | 1 DELTA 8 | 1 DELTA 8 | 1 DELTA 8 | 1 DELTA 8 | 1 DELTA 8 | 1 DELTA 8 | 1 DELTA 8 | 1 DELTA 8 | 1 DELTA 8 | 1 DELTA 8 |
| RF LINK | OK | OK | OK | OK | RESELECTION | | | | | | | | | |
| SOURCE — TYPE OF FRAME AT SOURCE | FULL 1 | 1 DELTA 1 | 1 DELTA 7 | 1 DELTA 8 | 1 DELTA 9 | 1 DELTA 10 | FULL 13 | 13 DELTA 1 | 13 DELTA 2 | 13 DELTA 3 | 13 DELTA 4 | 13 DELTA 5 | 13 DELTA 6 | |

…

APPLICATION AND TRANSPORT ADAPTATION FOR A WIRELESS COMMUNICATION PRIOR TO A RESELECTION

TECHNICAL FIELD

This invention relates generally to detecting a reselection, a seamless transition from one device to another, or a service interruption for a mobile station and either modifying an executed application or performing a modification to a wireless communication to minimize the effect of the reselection, seamless transition, or service interruption.

BACKGROUND

A mobile station communicating with a wireless entity such as a base station or a target mobile station sometimes undergoes a reselection. The reselection is a handover such that the mobile station is communicating with a different base station or in a different sector. The mobile station may also undergo a seamless transition whereby communication from the base station is switched over from a first device of the mobile station to a second device. For example, a user can sometimes switch over from communicating with the base station via a first cellular telephone to a second cellular telephone. Alternatively, the user could switch over from talking via a handheld telephone receiver to talking via a speaker phone.

During the interval before a reselection many current systems continue normal video, background, packet header, audio, presence, e-mail, and packetization updates. This, however, can result in data being lost. In the event that, e.g., vocoded audio packets are being transmitted, audio is sometimes discarded or an audio gap is introduced when a vocoded frame buffer is still being filled with frames, but has not yet been transmitted, at the time of the reselection. Alternatively, audio sometimes discarded or an audio gap is introduced when a vocoded frame packet has not yet completed transmission at the time of the reselection. Another problem is that sometimes certain types of frames of video data are transmitted that indicate only the differences in the frame from the previous frame. Each time the differences from the previous frame are transmitted, there is a certain possibility of error that increases with each frame. During a reselection none of this incremental data can be transmitted. Therefore, in the event that an error is included/has occurred in any of the previous frames up until the last "full frame" (i.e., the most recent frame which does not indicate incremental differences between a previous frame), the erroneous video frame data may be utilized for the duration of the reselection, which may result in erroneous video data being viewed at a target mobile station for an extended period of time.

Another problem that can arise occurs when the mobile station is in a sector or is communicating with a base station that is currently experiencing high throughput, but is about to experience a reselection that would result in the mobile station communicating with another base station or sector having a much lower throughput. Consequently, in the event that the mobile station needs to synchronize data such as an email application, this synchronization may not be possible or will be less efficient in the second sector or base station.

Another problem that can arise occurs when the mobile station is in a sector or is communicating with the station that is currently supporting a larger number of other mobiles which are interested in the same broadcast content over a short channel, but is about to experience a reselection would result in the mobile communicating with another base station or sector which has no other mobiles interested in the same broadcast content. An example of this broadcast content might be a video news update. Consequently, in the event that the mobile station needs to download this video news update, the synchronization is less efficient under the second sector or base station, because there are no other mobiles which can share a share channel with that mobile in the second base station.

Current systems do not anticipate these potential problems or take corrective actions to avoid service disruption.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 illustrates a table showing examples of the risk of error and degradation of video frames transmitted according to the prior art; and FIG. 8 illustrates a table showing examples of the risk of error and degradation of video frames transmitted according to at least one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

At least one embodiment of the invention is directed towards increasing system capacity of a wireless network and minimizing possible adverse effects of a reselection, service interruption, or a seamless transition. The reselection is a handover such that the mobile station is communicating with a different base station or in a different sector than that which the mobile station was originally in communication with. The mobile station may also undergo a seamless transition whereby communication from the base station is switched over from a first device of the mobile station to a second device. For example, a user can sometimes switch over from communicating with the base station via a first cellular telephone to a second cellular telephone. Alternatively, the user could switch over from talking via a handheld telephone receiver to talking via a speaker phone.

The mobile station or a radio access network with which the mobile station is in communication may detect an impending reselection, service interruption, or seamless transition and make appropriate corrective actions to minimize possible adverse effects that may result in degraded system performance.

Pursuant to the various embodiments described below, a method is provided in which a time interval is detected for the mobile station in communication with a wireless entity between a current time and an occurrence of at least one of a reselection, a service interruption, and a seamless transition. At least one of the following is performed: (a) a full update of a data frame prior to the at least one of the reselection and the service interruption; (b) a synchronization of a mobile station application prior to the at least one of the reselection and the service interruption; or (c) a temporary modification of at least one of a network application and the mobile station application to enhance an experience of a user of the mobile station prior to the at least one of the reselection and the seamless transition. The current time may be either prior to the occurrence or after the occurrence.

Figure 1:
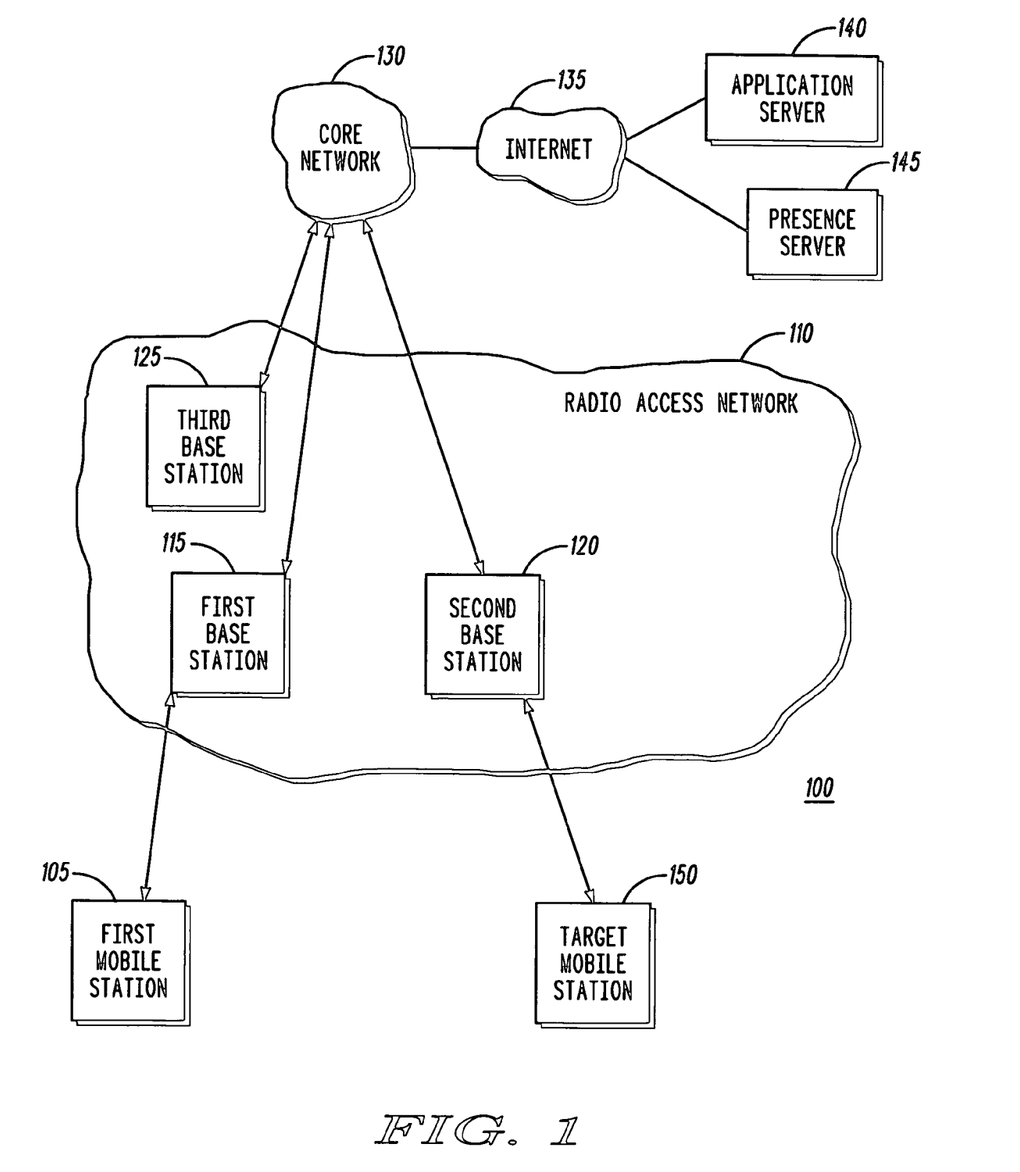
FIG. 1 illustrates a wireless system according to at least one embodiment of the invention.

FIG. 1 illustrates a wireless system 100 according to at least one embodiment of the invention. As illustrated, the system 100 includes a first mobile station 105, a radio access network 110, a first base station 115, a second base station 120, a third base station 125, a core network 130, the Internet 135, an application server 140, a presence server 145, and a target mobile station 150. The first mobile station 105 may be in direct wireless communication with the first base station 115. For example, the first mobile station 105 may engage in a telephone call with the target mobile station 150. During the call, audio and or/other data such as video data is transmitted between the first mobile station 105 and the first base station 115. The first base station 115, in turn, communicates the data to the core network 130. The core network 130 subsequently communicates the data with the second base station 120, which transmits the data to the target mobile station 150. Although the target mobile station 150 is shown as receiving the data wirelessly, it should be appreciated that a hard-wired target could instead be utilized, such as a hard-wired telephone.

As shown, the first base station 115, the second base station 120, and the third base station 125 are each contained within the radio access network 110. In alternative embodiments, the first base station 115, the second base station 120, and the third base station 125 may each be in different radio access networks, or, e.g., the first base station 115 and the second base station 120 may be within the radio access network 110, while the third base station 125 is within a different radio access network, and so forth. Also, although the first base station 115, the second base station 120, and the third base station 125 are each shown as being in communication with a single core network 130, it should be appreciated that in other embodiments, multiple core networks may be utilized whereby not all of the first base station 115, the second base station 120, and the third base station 125 are in communication with the same core network 130.

As illustrated, the core network 130 communicates data to the Internet 135. In other embodiments, another network other than the Internet 135 may be utilized such as a proprietary network or a local area network ("LAN"). The core network 130 may communicate data with other entities such as the application server 140 and the presence server 145. The application server 140 may be utilized for a variety of purposes such as, e.g., to implement a gaming environment. For example, in the event that the first mobile station is a Personal Digital Assistant ("PDA") or other device capable of allowing a user to play a game, the game may be executed by a processor within the application server 140 and data corresponding to the game may be transmitted from the application server 140, through the Internet 135 and core network 130, to the first base station 115, which relays the gaming data to the first mobile station 105.

The presence server 145 may store the present state of the first mobile station 105, as well as the states of other devices such as the target mobile station 110. These states are useful for Instant Messaging. The various types of states stored in the presence server 135 include "on the phone," "in a meeting," and other various expressions for indicating whether a user of a particular mobile station is available to receive a call or engage in Push-To-Talk ("PTT") or some other mobile-to-mobile communication. In many cases, a state is an attribute that describes information about the mobile station to make it easier for another mobile station to decide whether to call the mobile station.

The third base station 125 may also be included within the radio access network 110. In the event that the first mobile station 105 is physically moving, the first mobile station 105 may undergo a reselection whereby the first mobile station 105 is handed over from the first base station 115 to the third base station 145. In the event of the reselection, video and/or audio data or other content being transmitted from the first mobile station 105 to the radio access network 110 is occasionally lost, sometimes requiring the data to be re-sent, as discussed below with respect to FIGS. 3 and 4.

Figure 2:
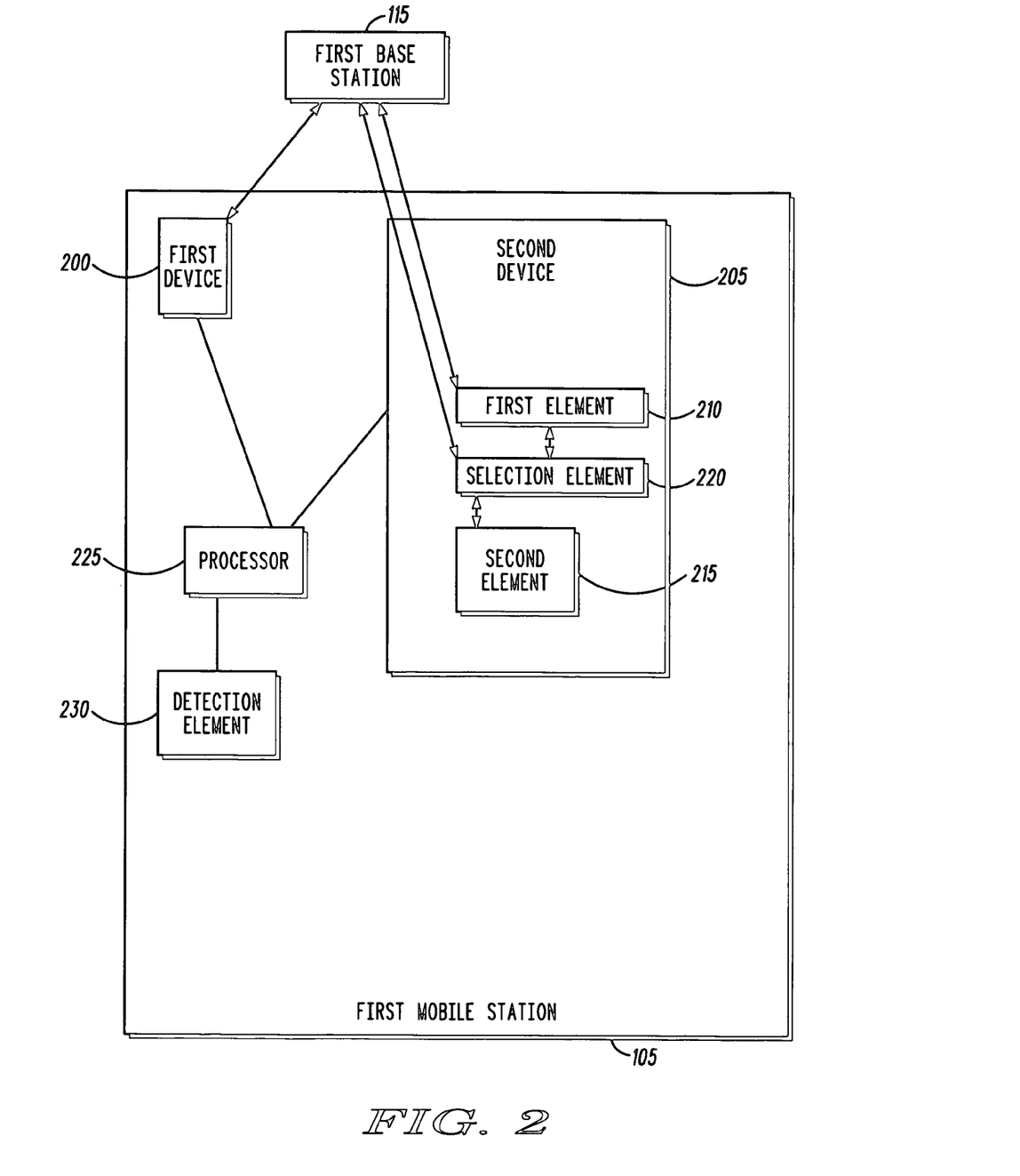
FIG. 2 illustrates the first mobile station according to at least one embodiment of the invention.

FIG. 2 illustrates the first mobile station 105 according to at least one embodiment of the invention. As shown, the first mobile station 105 may include multiple devices such as a first device 200 and a second device 205. For example, the first device 200 may be a PDA and the second device 205 may be a cellular telephone. Accordingly, a user can utilize either the first device 200 or the second device 205 to communicate with the first base station 115. In the event that the user is playing a networked game, the player may choose utilize the first device 200 to communicate with the first base station 115. Other the hand, the user may utilize the second device 205 when engaging in an audio conversation. In at least one embodiment, the user may only use one of the first device 200 and the second device 205 at a particular time to communicate data with the first base station 115. The second device 205 may include a first element 210 and a second element 215. For example, the first element 210 may include a standard speaker such that the user can hear audio data when the second device 205 is held physically close to the user's ear. The second element 215, on the other hand, may include a larger speaker such that the user can hear the audio conversation from further away, much like a speaker phone.

The user may utilize the first mobile station 105 to undergo a reselection whereby the user switches over communication with the first base station 115 from, e.g., the first device 200 to the second device 205 or from the first element 210 of the second device 205 to the second element 215. Accordingly, when, e.g., the user desires to switch over from the first element 210 to the second element 215 to communicate with the first base station 115, a reselection occurs. A selection element 220 may be utilized to initiate the reselection. For example, the selection element 220 may comprise a depressible button.

Accordingly, there are at least two types of reselection possible. The first type, as discussed above with respect to FIG. 1, entails the first mobile station 105 switching over from communicating with the first base station 115 to the third base station 125. The second type, on the other hand, entails the user switching over communication with the first base station 115 from, e.g., the first device 200 to the second device 205 or from the first element 210 of the second device 205 to the second element 215. During either type of reselection, disruptions in data flow between, e.g., the first mobile station 105 and the first base station 115 often occur in prior art systems.

The first mobile station 105 may include a detection element 230 to detect an impending reselection. Alternatively, the reselection may be detected after it has already occurred. It should also be appreciated that the detection element 230 is not required in embodiments where the radio access network 110 informs the first mobile station 105 of an upcoming reselection. The first mobile station 105 may also include a processor 225 to control the first device 200, the second device 205, and the detection element 225.

Figure 3:
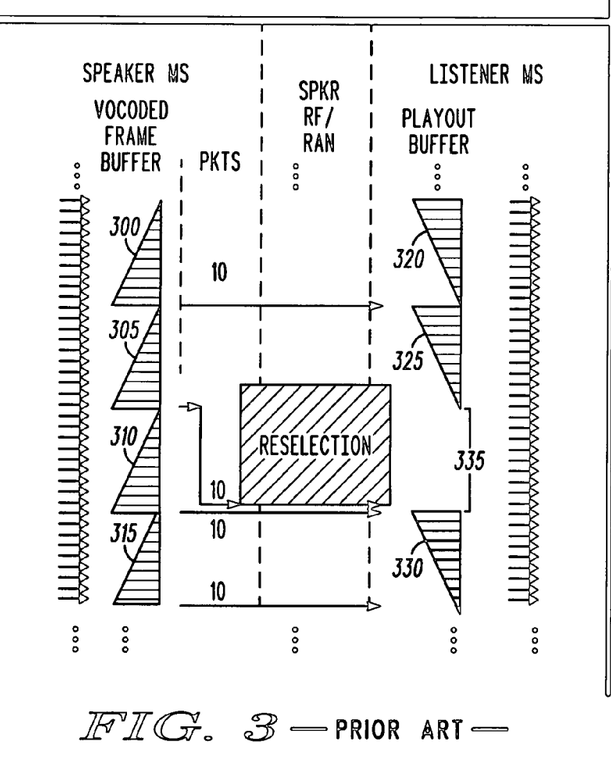
FIG. 3 illustrates the transmission of the vocoded audio packets from a mobile station to a network element according to the prior art.

FIG. 3 illustrates the transmission of the vocoded audio frames from a mobile station, such as the first mobile station 105, to a network element, such as the first base station 115, according to the prior art. As shown, ten vocoded audio frames are added to each of the first frame buffer 300, a second frame buffer 305, a third frame buffer 310, and a fourth frame buffer 315. When the first frame buffer 300 is filled with the ten vocoded audio frames, these ten vocoded audio frames are transmitted across the network until they reach their target, such as the target mobile station 150 shown above in FIG. 1. The ten received vocoded audio frames are inserted into a playout buffer of the target mobile station 150. In this case, the ten received vocoded audio frames are inserted into the second playout buffer 325. The first playout buffer 320, on the other hand, includes a set of ten vocoded audio frames received from the vocoded frame buffer (not shown) prior to the first vocoded frame buffer 300. Each of the ten vocoded audio frames inside of the one transport packet are decoded by the target mobile station 150, and the audio contained in the decoded audio packets is subsequently played for the user by the target mobile station 150.

The second set of ten vocoded audio frames in the second vocoded frame buffer 305 are intended to be subsequently transmitted once the second vocoded frame buffer has been filled with the next ten packets. However, as shown in FIG. 3, a reselection has occurred while the second vocoded frame buffer 305 was still being filled with the vocoded audio frames. During the reselection, this prior art system cannot transmit vocoded audio frames from any vocoded frame buffers. As a result, if a vocoded frame buffer is filled while the reselection is occurring, the vocoded audio frames in the vocoded frame buffer are either delayed, delayed until they are relevant, or lost, i.e., not transmitted to the target mobile station. As shown in FIG. 3, the second vocoded frame buffer 305 is filled completely with ten vocoded audio frames during the reselection. Consequently, the vocoded audio frames in the second vocoded frame buffer 305 are not transmitted or arrive later or too late to the target mobile station 150. Therefore, the target mobile station 150 experiences the illustrated gap 335 where no vocoded audio frames from the second vocoded frame buffer 305 are received. The gap 335 results between the time that the last vocoded audio frame from the first vocoded frame buffer 300 is played at the target mobile station and the time when the first vocoded audio frame from the second or third vocoded frame packet/buffer 310 is transmitted to the target mobile station 150. In the event that each vocoded frame buffer contains 180 msec of audio data, an example gap of 180 msec is therefore experienced by the target mobile station 150.

Considering a case where the listener/target only has three vocoded frames left in its playout buffer that are yet to be played out at the time the reselection starts. In this case there will be a problem given an example reselection which is going to last as long as it would take to play out eight vocoded frames. For this reason, at least one embodiment of the invention performs, e.g., a full packetized vocoded frame update immediately before the reselection.

Figure 4:
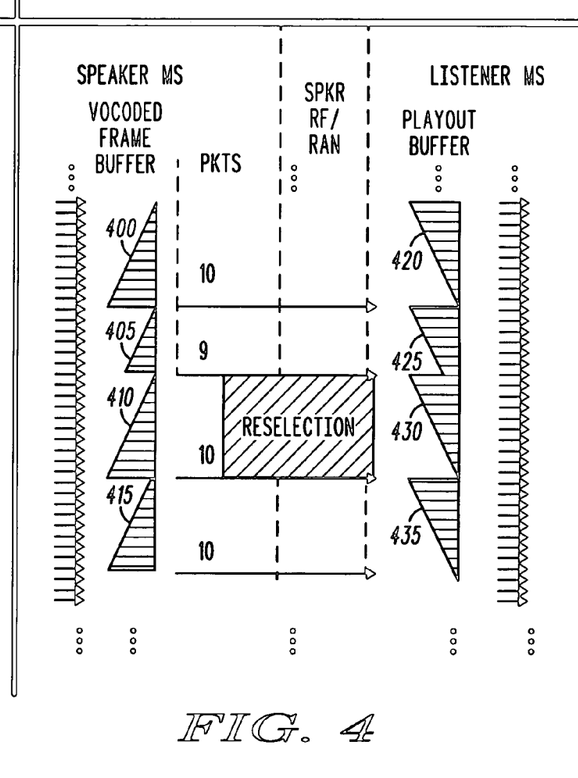
FIG. 4 illustrates the transmission of the vocoded audio frames from a mobile station to a network element according to at least one embodiment of the invention.

FIG. 4 illustrates the transmission of the vocoded audio frames from a mobile station, such as the first mobile station 105, to a network element, such as the first base station 115, according to at least one embodiment of the invention. As shown, vocoded audio frames are added to a first frame buffer 400, a second frame buffer 405, a third frame buffer 410, and a fourth frame buffer 415. In this illustration, each frame buffer is normally filled with ten vocoded audio frames. It should be appreciated that the use of ten vocoded audio frames in the vocoded frame buffer has been selected for exemplary purposes only. A different amount of vocoded audio frames may be included in each vocoded frame buffer, depending on the system requirements.

In the event that the first mobile station 105 or the radio access network detects an upcoming reselection, the number of vocoded audio frames added to a vocoded frame buffer just before the reselection may be adjusted. In this example, the second frame buffer 405 is filled with only nine vocoded audio frames, instead of the standard ten vocoded audio frames. The first frame buffer 400, the third frame buffer 410, and the fourth frame buffer 415 are each filled with ten vocoded audio frames. Either the first mobile station 105 or the radio access network detects the impending reselection. In advance of the reselection, the first mobile station 105 adjusts the number of vocoded audio frames to fit into the second vocoded frame buffer 405 so that the vocoded audio frames in the second vocoded frame buffer 405 can be transmitted across the network and over to the target mobile station 150 before the reselection, at which point it would not be possible for the first mobile station 105 to transmit the vocoded audio frames in the second vocoded frame buffer 405 until after the reselection has been completed. As shown, the vocoded audio frames in the first vocoded frame buffer 400 are transmitted and inserted into the second playout buffer 425 at the target mobile station 150. The vocoded audio frames are then removed over time, decoded, and played for the target user of the target mobile station 150.

Prior to the second playout buffer 425 being completely depleted of the vocoded audio frames, nine vocoded audio frames of the second playout buffer 405 are transmitted to the target mobile station 150. The received vocoded audio frames are added to the remaining vocoded audio frames in the second playout buffer 425 to form the third playout buffer 430. The reselection subsequently occurs while the vocoded audio frames of the third playout buffer 430 are being decoded and played by the target mobile station 150. At the moment that the third playout buffer 430 is depleted, the reselection is completed, and then the vocoded audio frames of the third vocoded frame buffer 410 are transmitted by the first mobile station and added to the fourth playout buffer 435 at the target mobile station. Accordingly, as shown in FIG. 4 there is no audio gap or discarded late audio data received by the target mobile station 150 because the number of vocoded audio frames in the second vocoded frame buffer 405 was adjusted to transmit the vocoded audio frames in the second vocoded frame buffer 405 prior to the reselection. Alternatively, a shorter audio sample per packet may also be used prior to the reselection. If the target playout buffer is particularly low, then it is particularly important to perform such an update to send more of the vocoded audio frames to the target playout buffer.

In an example where the listener/target has nine vocoded frames left in its playout buffer that are not yet played out at the time the reselection starts, no problems occur. In this case there will not be a problem because the exemplary reselection is only going to last as long as it will take to playout eight vocoded frames. For this reason, the system may potentially avoid doing a full packetized vocoded frame update immediately before this reselection.

Figure 5:
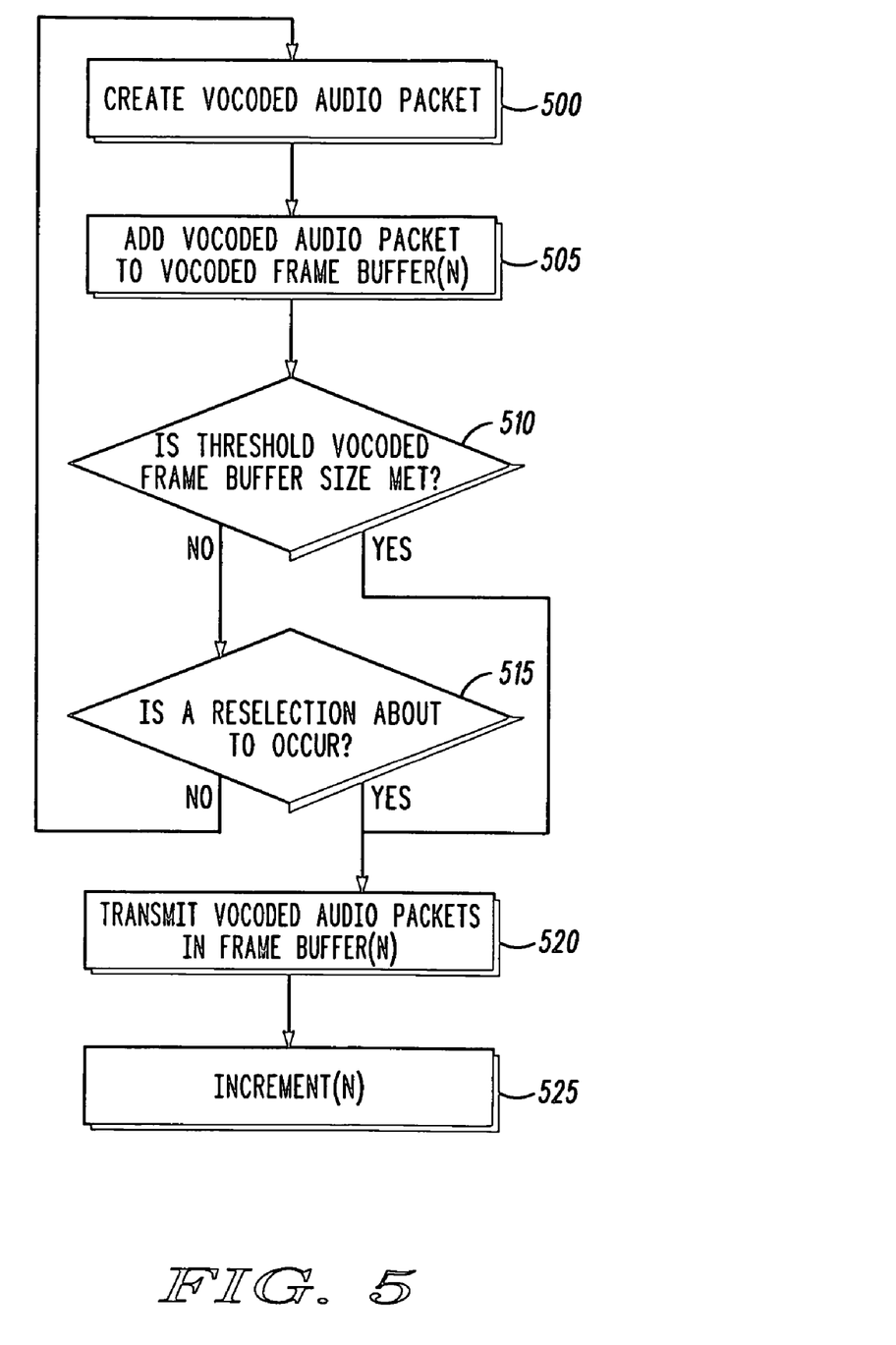
FIG. 5 illustrates a method of creating vocoded frame buffers and transmitting vocoded audio frames in the vocoded frame buffers according to at least on embodiment of the invention.

FIG. 5 illustrates a method of creating vocoded frame buffers and transmitting vocoded audio frames in the vocoded frame buffers according to at least on embodiment of the invention, as discussed above. First, at operation 500, a vocoded audio frame is created by, e.g., the first mobile station 105. Next, at operation 505, the vocoded audio frame is added to vocoded frame buffer N, where N is a counter. At operation 510, a determination is made as to whether the threshold vocoded frame buffer size has been met by the vocoded frame buffer N. As discussed above with respect to FIG. 4, the threshold size may be ten vocoded audio frames. If "no," processing proceeds to operation 515 where a determination is made as to whether a reselection is about to occur or has recently occurred. If at operation 515 it is determined that a reselection is not about to occur or has recently occurred, processing returns to operation 500 so that another vocoded audio picket can be added to the vocoded frame buffer N. If the answer at operation 510 is "yes," on the other hand, processing proceeds to operation 520 where the vocoded audio frames in vocoded frame buffer N are transmitted across the network to the target mobile station 150. Finally, at operation 525, the counter N is incremented and then processing returns to operation 500. The method of FIG. 5 may be implemented by, e.g., a processor in the first mobile station 105.

Figure 6:
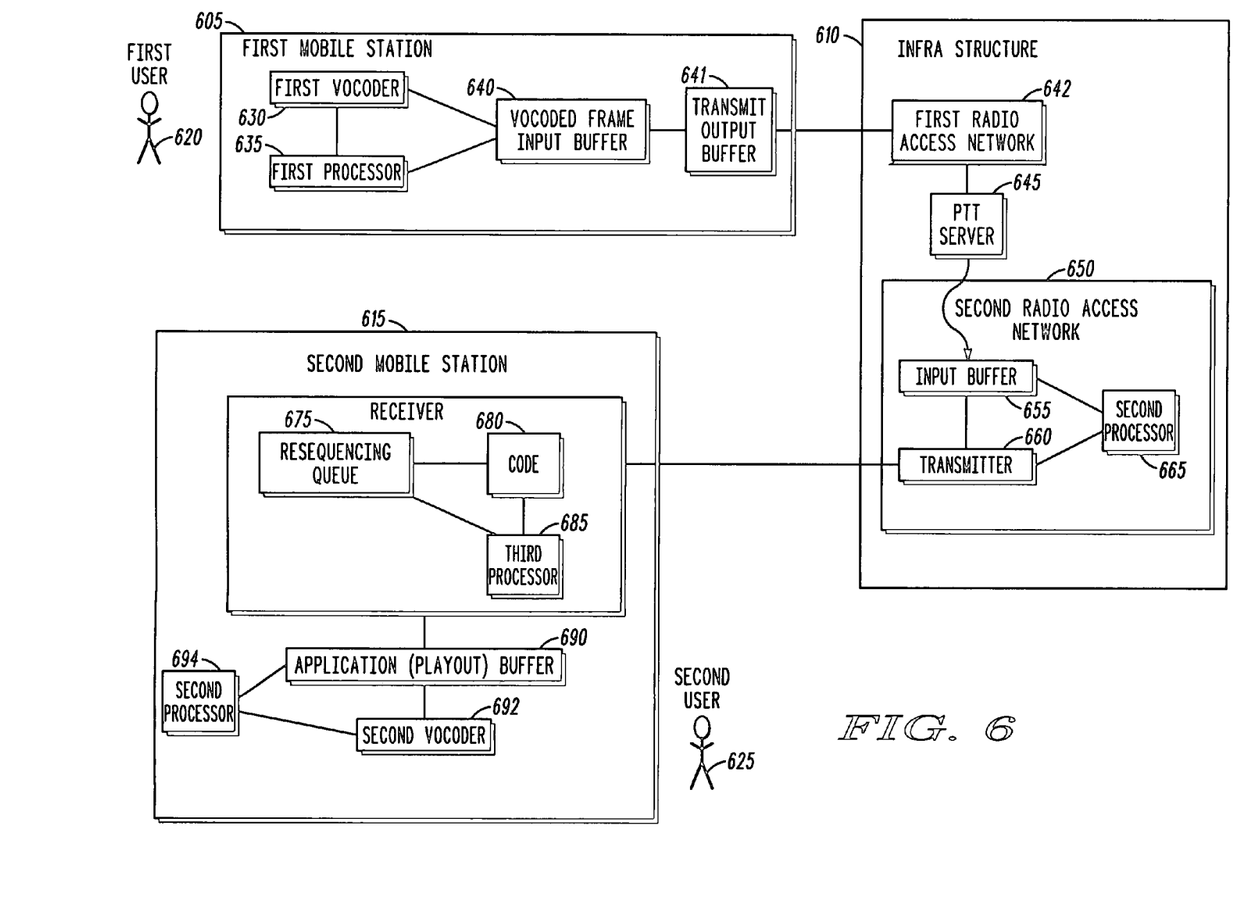
FIG. 6 illustrates a system for implementing the method of FIG. 5 for creating vocoded frame buffers and transmitting vocoded audio packets in the vocoded frame buffers according to at least one embodiment of the invention.

FIG. 6 illustrates a system 600 for implementing the method of FIG. 5 for creating vocoded frame buffers and transmitting vocoded audio frames in the vocoded frame buffers according to at least one embodiment of the invention. The system 600 includes a first mobile station 605, an infrastructure 610, and a second mobile station 615. A first user 620 may utilize the first mobile station 605 to communicate with a second user 625 of the second mobile station 615. The first mobile station may include a first vocoder 630, a first processor 635, and a vocoded frame input buffer 640. When the first user 620 speaks, the first user's audio is encoded into vocoded audio frames by the first vocoder 630. The vocoded audio frames are then placed into the vocoded frame input buffer 640. The first processor 635 may control the first vocoder 630 and the placing of the vocoded audio frames into the vocoded frame input buffer 640. The vocoded frame input buffer 640 holds accumulated vocoded frames and waits for additional vocoded frames before these frames are transformed into a packet. Next, once the vocoded frame input buffer 640 has a predetermined number of vocoded audio frames or the infrastructure or the first processor 635 determines that a reselection is about to occur, the vocoded audio frames in the vocoded frame input buffer 640 output to a transmit output buffer 641. The transmit output buffer 641 has a function of holding a packet that has been created but not yet transmitted or completely transmitted.

Unlike systems which transmit accumulated packets immediately when they detect a reselection coming, an aspect of the present invention is that the flow of information from the vocoded frame input buffer 640 to the transmit output buffer 641 is impacted, e.g., at which point the packetization process occurs. The packets are then transmitted wirelessly from the transmit output buffer 641 to a first radio access network 642 in the infrastructure 610.

The vocoded audio packets are subsequently transmitted to a Push-To-Talk ("PTT") server 645 or chat server, which then forwards the vocoded audio packets to a second radio access network 650. The vocoded audio packets are inserted into an input buffer 655. The input buffer 655 provides the vocoded audio packets to a transmitter 660 that transmits the vocoded audio packets to the second mobile station 615. The second radio access network 650 may include a second processor 665 to control the input buffer 655 and the RLP transmitter 660.

The vocoded audio packets are received by a receiver 670, which includes a resequencing queue 675 and code 680. The code 680 may be stored in a memory device. The receiver 670 has a function of receiving packetized bearer data and performing resequencing/reassembly. A third processor 685 is contained within the receiver 670 and may execute the code and control the resequencing queue 675. The vocoded audio packets are then sent to an application play-out buffer 690 where they are stored until a second vocoder 692 decodes the vocoded audio packets and plays them for the second user 625. The second mobile station 615 may include a fourth processor 694 to control the second vocoder 692. In some embodiments, a single processor can be used in the second mobile station 615 instead of the separate third processor 685 and the fourth processor 694.

Another function that may be implemented according to at least one embodiment of the invention relates to the transmission of video data. Specifically, when video data is transmitted, the first frame of the video data transmitted is a full video frame. However, to save bandwidth, only a portion of at least one subsequent frame is transmitted. For example, if the entire first frame is transmitted, the changes to the first frame are transmitted as the second frame. If the video frames include video of a person walking around a static background, most of the video data of the background is substantially the same from frame-to-frame. This is why only the changes to the first frame are transmitted as the second frame. Each time a video frame is transmitted, a small risk of error is introduced. For example, whenever a frame is sent there may be a 0.5% risk of error, or some other predetermined risk of error. In the event that the changes relative to the first frame are transmitted as the second frame, the risk of error is again introduced. The risk of error, however, for the second frame is cumulative with the first frame. That is, the risk of error for the second frame is not 0.5%. Instead, it is roughly (0.5%)*2, or 1%. Similarly, in the event that the third frame is a transmission of the changes to the second frame, the risk of error is again introduced and is also cumulative. In this example, the risk of error of the third frame is ~(0.5%)*3, and so forth. In addition, the accumulation of risk of error also happens on a different level. The discussion above focuses on the increased probability of problems caused by error accumulation due to packet loss, i.e., where the user's experience can be impacted by any vocoded frame/packet loss which has occurred since the last full update. In addition, there can be degradation resulting from the inability to the system to continue to update the current video frame by providing incremental updates relative to the previous frame.

FIG. 7 illustrates a table 700 showing examples of the risk of error and degradation of video frames transmitted according to the prior art. As shown, the first frame transmitted is a full frame, designated "FULL 1." The second frame transmitted includes the changes made to the first frame, designated "1 Delta 1." The term "Delta" is indicative of the fact that only the changes are being transmitted as the second frame. The subsequent ten frames are also transmissions of changes from one frame to the next (up through 1 Delta 11). The next video frame to be transmitted is the 13th video frame (designated Full 13). Not all of these video frames can be transmitted, however, because a reselection occurs after the ninth frame (i.e., 1 Delta 8) is transmitted. Accordingly, the other frames after ninth frame cannot be transmitted until after the reselection has been completed. A problem arises in the event that the ninth frame transmitted includes errors. As shown in the first table 700, the ninth frame has a risk of error of ~9*X %, where X represents the risk of error that a particular frame includes errors. Because of the reselection after the ninth frame has been transmitted, any errors in the ninth frame will remain visible to a target user receiving the video frames for the entire duration of the reselection. As shown, the ninth frame is utilized in place of the next ten frames, which cannot be transmitted due to the reselection. Unfortunately, this can result in a much higher than normal probability of an error being displayed to the target user for a period of time that may cause disruption in, e.g., the playing of a networked video game. As shown, another measure of error is the "degradation," i.e., the sum of the change number (i.e., the delta number for a particular frame) and the age (i.e., the length by which the last frame is utilized in place of the next frame which cannot be received due to the reselection) of the frame. As shown, the degradation gets progressively worse during the reselection.

FIG. 8 illustrates a table 800 showing examples of the risk of error and degradation of video frames transmitted according to at least one embodiment of the invention. As shown, the first frame transmitted is a full frame, designated "FULL 1." The second frame transmitted includes the changes made to the first frame, designated "Delta 1." The subsequent six frames are also transmissions of changes from one frame to the next (up through 1 Delta 7). At this point the radio access network 110 or the first mobile station 105 detects an impending reselection. To minimize the possibility of erroneous video frames being utilized by the target mobile station 150 for an extended period of time, a full video frame (i.e., Frame 8) is transmitted prior to the reselection. Accordingly, the risk of error during the reselection is 1*X % instead of 9*X % as it was according to the prior art system discussed above with respect to FIG. 7.

As discussed above, the radio access network 110 may notify the first mobile station 105 of an impending reselection or the first mobile station may anticipate the impending reselection itself. The reselection may be anticipated based on at least one of path prediction of the trajectory of the first mobile station and data source control ("DSC"). The impending reselection may also be detected on the basis of the measured strength of a signal transmitted from the first base station 115 to the first mobile station 105. In the event that the signal strength falls below a predetermined threshold, the first mobile station 105 may, e.g., determine it is moving out of the geographical area covered by the first base station 115 and that a reselection will soon occur.

The first mobile station 105 may also be able to determine a congestion level at a new base station, such as the third base station 125 prior to the reselection. Accordingly, in the event that the third base station 125 has much more congestion that the first base station 115, the first mobile station 105 may transmit certain information while being serviced by the first base station 115 that it may not be able to transmit after a reselection at which point it is serviced by the third base station 125. For example, the first mobile station 105 may update its presence information and any of the presence information it may have for neighboring mobile base stations by transmitting such information to the presence server 145 shown in FIG. 1.

Once the reselection is detected, of the first mobile station 105 is playing a networked game being executed on, e.g., the application server 140, the gaming scenario may be modified in accordance with the transition. For example, the radio link quality of service ("QoS") may be increased around the reselection. The user may also be separated from other users playing the game. For example, visual elements may be altered such as concrete barriers separating the users or lights being out between two users driving down a tunnel in the game. Auditory changes may also be made. For example, the users may be separated by creating loud noises so that the users cannot hear each other. The user's touch and reaction speed may also be altered. For example, the user may be temporarily numb or unconscious in the gaming context or may be provided with extra protection to avoid injury during the reselection.

In the event that the user is displaying a Powerpoint™ slide during a NetMeeting™, a detected reselection may result in certain items being displayed to the user. For example, sports scores or commercials may be displayed during the duration of the reselection.

Upon detection of an impending reselection, alerts may be displayed to the user for presence information, a low battery state, byte count, calendar, email, or instant messaging information. Also, an application program being executed may be stopped or suspended and a different application may be executed such as a virus scanning application program. Also, if the user was about to engage in a transaction, such as electronic banking, the transaction may not be initiated after detection of an impending reselection, e.g. until after the reselection is complete.

If the first mobile station 105 is to send out invites to other mobiles stations to engage in, e.g., a PTT communication, the order in which the other mobile stations are invited may be modified upon detection of an impending reselection. For example, the mobile station likely to take the longest to respond may be invited first, followed by the mobile station likely to take the second longest, and so forth. Also, both users may be given the floor so they may both listen after reselection. In other words, normally within a PTT call, only one user at a time is given permission to speak. "Determine a floor" is used to reference the ability to speak. However, during a long reselection, there will not be a bearer path between the parties. Both parties can make use of their time during this reselection by recording a talkspurt, i.e., some audio. Then both parties will listen to the other parties audio immediately after the reselection. This is an improvement as it avoids rendering this time during the reselection as being completely lost time.

Pursuant to the various embodiments described above, a method is provided in which a time interval is detected for a mobile station in communication with a wireless entity between a current time and an occurrence of at least one of a reselection, a service interruption, and a seamless transition. At least one of the following is performed: (a) a full update of a data frame prior to the at least one of the reselection and the service interruption; (b) a synchronization of a mobile station application prior to the at least one of the reselection and the service interruption; or (c) a temporary modification of at least one of a network application and the mobile station application to enhance an experience of a user of the mobile station prior to the at least one of the reselection and the seamless transition. The current time may be either prior to the occurrence or after the occurrence.

The temporary modification of the at least one of the network application and the mobile station application may include utilizing a higher quality representation of data received from the wireless entity or suspending video displayed on a display of the mobile station. Alternatively, it may include performing at least one of adapting a gaming scenario and slowing the gaming scenario to minimize an impact of the reselection on the experience of the user, or slowing down at least one of audio playout and video playout. The temporary modification may also entail utilizing a higher radio link quality of service for the communication or displaying at least one alert on the display for at least one of a calendar application, an e-mail application, an Instant Messaging application, a low battery indication, and a byte count indication. It may further include switching from the mobile station application to a different mobile station application, inhibiting a transaction initiation, or simultaneously providing a floor grant to multiple parties within a Push-To-Talk call.

An inhibited transaction may include at least one of a financial transaction and a Push-To-Talk transaction. The aforementioned seamless transition may comprise switching utilization of data received from the wireless entity from a first device of the mobile station to a second device of the mobile station. The data frame may include a full update video frame, a differential update video frame a gaming update, background noise data, packetized voice data, shorter voice sample per packet, a shorter voice sample per vocoded frame, or a packet header. A differential update frame is not self-sufficient. For example, the receiver needs to receive not only the differential frame but also some previous frames in order to make use of the information. In contrast, a full update frame is self-sufficient, e.g., the receiver can display something meaningful when all it is this single full update frame.

At least one of the reselection and the service interruption may be caused by an RF link along an end-to-end connection between the first mobile station 105 and the wireless entity, such as the first base station 115. At least one of the wireless entity and a radio access network 110 may be notified of the reselection time. At least one of the wireless entity and a target mobile station 150 may be informed of the reselection. The reselection may be anticipated based on at least one of a path prediction and a data source control ("DSC").

The synchronization of the mobile station application may include, e.g., synchronizing email, a latest wikki document version, presence information, a location, a motion, a smell, a heart rate, a stock price, a latest bid price of an auction item, a latest sports score, a latest weather prediction, latest news, latest traffic information, and/or driving directions.

The performing of the at least of the full update, the synchronization, and the temporary modification of the at least one of the network application and the mobile station application may be performed in response to a determination that the reselection is expected to last longer a first threshold such as, e.g., 4 seconds (where this is especially important if the user is currently interacting with the phone such that it will more likely suffer from lack of up-to-date information during this protracted reselection) or an initial playout buffer is below a pre-determined threshold. The performing may further be initiated in response to at least one of an anticipated peak bit rate and an anticipated average bit rate at new site is lower than a current bit rate range, or a time interval until another reselection is shorter than some second threshold such as, e.g., 200 ms. The performing may also be performed in response to a determination that more than a second threshold number of other mobile stations a same broadcast content as the mobile device and none of the other mobile stations are in a target sector after the performance of the at least one of the reselection, service interruption, and seamless transition. Alternatively, the performing may occur in response to a time interval until another reselection being shorter than a third threshold, or a number of other mobile stations desiring the same content in the same sector is greater than a fourth threshold.

If the mobile station has several running mobile station applications, the mobile station applications may be prioritized according to predetermined criteria and the temporary modification may be performed on at least a most delay-sensitive mobile station application.

Although the embodiments described above have been discussed with respect to a reselection, it should be appreciated that these teachings also apply to seamless transitions and service interruptions.

Pursuant to these teachings, communication of audio, video, and/or other data between a first mobile station 105 and a target mobile station 150 or other entity is improved and network bandwidth may be increased. By modifying running applications or altering the transmission of the audio, video, and/or data, communication is performed with no or minimal data being lost or delayed, as would occur in prior art systems.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method, comprising:
    detecting a time interval for a mobile station in communication with a wireless entity between a current time and an upcoming occurrence of a reselection;
    detecting, prior to the upcoming occurrence of the reselection, at least one data frame of at least one of a video data and an audio data which is scheduled to be transmitted during the upcoming reselection;
    performing a full update of the at least one data frame, while the mobile station is in communication with the wireless entity, prior to the upcoming occurrence of the reselection, and during the time interval between the current time and the upcoming occurrence of the reselection; and
    one or more of transmitting to a network and receiving from the network the full update of the at least one data frame prior to the upcoming occurrence of the reselection; and
    wherein the method further comprises anticipating the reselection based on at least one of a path prediction and a data source control ("DSC") and notifying at least one of the wireless entity and a radio access network of at least one of the reselection and a reselection time.

2. The method of claim 1, wherein the current time is prior to the upcoming occurrence.

3. The method of claim 1, wherein the performing of the full update of the at least one of the network application and the mobile station application is performed in response to:
    a determination that the reselection is expected to last longer than a first threshold;
    an initial play out buffer is below a pre-determined threshold;
    at least one of an anticipated peak bit rate and an anticipated average bit rate at new site is lower than a current bit rate range;
    a determination that more than a second threshold number of other mobile stations desiring a same broadcast content as the mobile device and none of the other mobile stations are in an anticipated target sector after the performance of the reselection;
a time interval until another reselection being shorter than a third threshold; and
a number of the other mobile stations desiring the same broadcast content in the same sector being greater than a fourth threshold.

4. The method of claim 1, wherein performing the full update of the at least one data frame further comprises
synchronizing a mobile station application during the time interval between the current time and the upcoming occurrence of the reselection.

5. The method of claim 4, wherein the synchronization of the mobile station application comprises synchronizing at least one of:
email;
a latest wikki document version;
presence information;
a location;
a motion;
a smell;
a heart rate;
a stock price;
a latest bid price of an auction item;
a latest sports score;
a latest weather prediction;
latest news;
latest traffic information; and
driving directions.

6. A method, comprising:
detecting a time interval for a mobile station in communication with a wireless entity between a current time and an upcoming occurrence of a seamless transition;
performing a full update of a data frame during the time interval between the current time and the upcoming occurrence of the seamless transition;
one or more of transmitting to the network and receiving from the network the full update of the data frame prior to the upcoming occurrence of the seamless transition; and
wherein the seamless transition comprises switching utilization of data received from the wireless entity from a first device of the mobile station to a second device of the mobile station.

7. A mobile station comprising:
a detection element to detect a time interval between a current time and an upcoming occurrence of a reselection from a wireless entity currently serving the mobile station to another wireless entity, and further to detect, prior to the upcoming occurrence of the reselection, at least one data frame of at least one of a video data and an audio data which is scheduled to be transmitted during the upcoming reselection;
a processing element to perform a full update of the at least one data frame, while the mobile station is in communication with the currently serving wireless entity, prior to the upcoming occurrence of the reselection, and during the time interval between the current time and the upcoming occurrence of the reselection;
wherein the processing element is configured to one or more of conveying to a network and receiving from the network the full update of the at least one data frame prior to the reselection; and
wherein the processing element further is configured to anticipate the reselection based on at least one of a path prediction and a data source control ("DSC") and notifying at least one of the wireless entity and a radio access network of at least one of the reselection and a reselection time.

8. The system of claim 7, wherein the wireless entity is at least one of a radio access network and a second wireless station.

9. The system of claim 7, wherein the video data comprises at least one of a full update video frame, a differential update video frame, a gaming update and further wherein the audio data comprises at least one of a background noise data, packetized voice data, shorter voice sample per packet, and a shorter voice sample per vocoded frame.

10. The system of claim 7, wherein the processing element to perform the full update of the at least one data frame is further adapted to synchronize a mobile station application during the time interval between the current time and the upcoming occurrence of the reselection.

11. The system of claim 10, wherein the synchronization of the mobile station application comprising synchronizing at least one of:
email;
a latest wikki document version;
presence information;
a location;
a motion;
a smell;
a heart rate;
a stock price;
a latest bid price of an auction item;
a latest sports score;
a latest weather prediction;
latest news;
latest traffic information; and
driving directions.

12. A mobile station, comprising:
a detection element to detect a time interval between a current time and an upcoming occurrence of a seamless transition, wherein the mobile station is in communication with a wireless entity;
a processing element to perform a full update of a data frame, while the mobile station is in communication with the wireless entity, prior to the upcoming occurrence of the seamless transition, and during the time interval between the current time and the upcoming occurrence of the seamless transition;
wherein the processing element configured to one or more of conveying to a network and receiving from the network the full update of the data frame prior to the upcoming occurrence of seamless transition; and
wherein the processing element further is configured to switch utilization of data received from the wireless entity from a first device of the mobile station to a second device of the mobile station.

13. The mobile station of claim 12, wherein the wireless entity is at least one of a radio access network and a second wireless station.

14. The mobile station of claim 12, wherein the data frame comprises at least one of a full update video frame, a differential update video frame, a gaming update, background noise data, packetized voice data, shorter voice sample per packet, a shorter voice sample per vocoded frame, and a packet header.

15. The mobile station of claim 12, wherein the processing element to perform the full update of the data frame is further adapted to synchronize a mobile station application during the time interval between the current time and the upcoming occurrence of seamless transition.

16. The mobile station of claim 15, wherein the synchronization of the mobile station application comprising synchronizing at least one of:
email;
a latest wikki document version;
presence information;
a location;
a motion;
a smell;
a heart rate;
a stock price;
a latest bid price of an auction item;
a latest sports score;
a latest weather prediction;
latest news;
latest traffic information; and
driving directions.

17. A method, comprising:
detecting a time interval for a mobile station in communication with a wireless entity between a current time and an upcoming occurrence of at least one of a reselection, a service interruption, and a seamless transition;
performing a temporary modification of at least one of a network application and the mobile station application while the mobile station is in communication with the wireless entity, prior to the upcoming occurrence of at least one of the reselection, the service interruption, and the seamless transition, and during the time interval between the current time and the upcoming occurrence of the at least one of the reselection, the service interruption, and the seamless transition, wherein the temporary modification of the at least one of the network application and the mobile station application comprises at least one of: utilizing a higher quality representation of data received from the wireless entity; suspending video displayed on a display of the mobile station; performing at least one of adapting a gaming scenario and slowing the gaming scenario to minimize an impact of the reselection on the experience of the user; slowing down at least one of audio playout and video playout; inhibiting a transaction initiation; and simultaneously providing a floor grant to multiple parties within a Push-To-Talk call.

18. The method of claim 17, wherein in response to the mobile station having several running mobile station applications, the mobile station applications are prioritized according to predetermined criteria and the temporary modification is performed on at least a most delay-sensitive mobile station application.

19. The method of claim 17, wherein the performing the temporary modification of the at least one of the network application and the mobile station application is performed in response to:
a determination that the reselection is expected to last longer than a first threshold;
an initial play out buffer is below a pre-determined threshold;
at least one of an anticipated peak bit rate and an anticipated average bit rate at new site is lower than a current bit rate range;
a determination that more than a second threshold number of other mobile stations desiring a same broadcast content as the mobile device and none of the other mobile stations are in an anticipated target sector after the performance of the at least one of the reselection, service interruption, and seamless transition;
a time interval until another reselection being shorter than a third threshold; and
a number of the other mobile stations desiring the same broadcast content in the same sector being greater than a fourth threshold.

20. The method of claim 17, wherein the transaction is at least one of a financial transaction and a Push-To-Talk transaction.

21. A system, comprising:
a wireless entity to provide wireless data;
a mobile station in communication with the wireless entity to receive the wireless data, the mobile station comprising:
a detection element to detect a time interval between a current time and an upcoming occurrence of at least one of a reselection, a service interruption, and a seamless transition;
a processing element to perform a temporary modification of at least one of a network application and the mobile station application, while the mobile station is in communication with the wireless entity, prior to the upcoming occurrence of at least one of the reselection, the service interruption, and the seamless transition, and during the time interval between the current time and the upcoming occurrence of at least one of the reselection, the service interruption, and the seamless transition, wherein the temporary modification of the at least one of the network application and the mobile station application comprises at least one of: utilizing a higher quality representation of data received from the wireless entity; suspending video displayed on a display of the mobile station; performing at least one of adapting a gaming scenario and slowing the gaming scenario to minimize an impact of the reselection on the experience of the user; slowing down at least one of audio playout and video playout; inhibiting a transaction initiation; and simultaneously providing a floor grant to multiple parties within a Push-To-Talk call.

22. The system of claim 21, wherein the processing element is adapted to perform the temporary modification of at least one of the network application and the mobile station application comprises at least one of:
utilizing a higher quality representation of data received from the wireless entity;
suspending video displayed on a display of the mobile station;
performing at least one of adapting a gaming scenario and slowing the gaming scenario to minimize an impact of the reselection on the experience of the user;
slowing down at least one of audio playout and video playout;
utilizing a higher radio link quality of service for the communication;
displaying at least one alert on the display for at least one of a calendar application, an email application, an Instant Messaging application, a low battery indication, and a byte count indication;
switching from the mobile station application to a different mobile station application;
inhibiting a transaction initiation; and
simultaneously providing a floor grant to multiple parties within a Push-To-Talk call.

23. The system of claim 21, wherein the transaction is at least one of a financial transaction and a Push-To-Talk transaction.

24. A mobile station, comprising:
a detection element to detect a time interval between a current time and an upcoming occurrence of at least one of a reselection, a service interruption, and a seamless transition, wherein the mobile station is in communication with a wireless entity;
a processing element to perform a temporary modification of at least one of a network application and the mobile station application, while the mobile station is in communication with the wireless entity, prior to the upcoming occurrence of at least one of the reselection, the service interruption, and the seamless transition, and during the time interval between the current time and the upcoming occurrence of at least one of the reselection, the service interruption, and the seamless transition, wherein the temporary modification of the at least one of the network application and the mobile station application comprises at least one of: utilizing a higher quality representation of data received from the wireless entity; suspending video displayed on a display of the mobile station; performing at least one of adapting a gaming scenario and slowing the gaming scenario to minimize an impact of the reselection on the experience of the user; slowing down at least one of audio playout and video playout; inhibiting a transaction initiation; and simultaneously providing a floor grant to multiple parties within a Push-To-Talk call.

25. The mobile device of claim 24, wherein the transaction is at least one of a financial transaction and a Push-To-Talk transaction.

\* \* \* \* \*